United States Patent
Fields et al.

(10) Patent No.: US 10,728,447 B2
(45) Date of Patent: Jul. 28, 2020

(54) CAPTURING IMAGES USING SUB-FRAME ILLUMINATION

(71) Applicant: Alibaba Group Holding Limited, George Town (KY)

(72) Inventors: Zikomo Fields, Lake Lotawana, MO (US); Yash Joshi, Kansas City, MO (US)

(73) Assignee: ALIBABA GROUP HOLDING LIMITED, George Town, Grand Cayman (KY)

( * ) Notice: Subject to any disclaimer, the term of this patent is extended or adjusted under 35 U.S.C. 154(b) by 0 days.

(21) Appl. No.: 16/172,447

(22) Filed: Oct. 26, 2018

(65) Prior Publication Data
US 2020/0137301 A1   Apr. 30, 2020

(51) Int. Cl.
H04N 5/232 (2006.01)
G06K 9/00 (2006.01)
H04N 5/225 (2006.01)
G06K 9/32 (2006.01)
H04N 5/235 (2006.01)

(52) U.S. Cl.
CPC ....... *H04N 5/23229* (2013.01); *G06K 9/0061* (2013.01); *G06K 9/3241* (2013.01); *H04N 5/2256* (2013.01); *H04N 5/2329* (2013.01); *H04N 5/2353* (2013.01)

(58) Field of Classification Search
None
See application file for complete search history.

(56) References Cited

U.S. PATENT DOCUMENTS

| 2008/0069411 | A1* | 3/2008 | Friedman | G06K 9/00255 |
| | | | | 382/118 |
| 2015/0199559 | A1* | 7/2015 | Sztuk | H04N 5/23219 |
| | | | | 348/78 |
| 2016/0219208 | A1* | 7/2016 | Horesh | H04N 5/23219 |
| 2016/0248971 | A1* | 8/2016 | Tall | H04N 5/23219 |
| 2017/0061210 | A1* | 3/2017 | Ollila | G06K 9/00604 |

(Continued)

OTHER PUBLICATIONS

Hudon et al., "High Speed Sequential Illumination with Electronic Rolling Shutter Cameras," CVPR Workshops, Jun. 2015, pp. 66-73.

(Continued)

*Primary Examiner* — James M Hannett
(74) *Attorney, Agent, or Firm* — Fish & Richardson P.C.

(57) ABSTRACT

The technology described in this document can be embodied in a method for capturing an image. The method includes generating a first control signal configured to cause a rolling shutter camera to capture an image of a subject over a first time period. The method also includes generating, at a first time point during the first time period, a second control signal configured to set a multi-spectral illumination source at a first intensity level. The multi-spectral illumination source is configured to illuminate the subject. The method further includes generating, at a second time point during the first time period, a third control signal configured to set the multi-spectral illumination source at a second intensity level that is less than the first intensity level. A portion of the image captured by the rolling shutter camera between the first and second time points includes a target feature associated with the subject.

21 Claims, 6 Drawing Sheets

(56) References Cited

U.S. PATENT DOCUMENTS

2017/0286792 A1* 10/2017 Ackerman ........... H04N 5/2329
2019/0294858 A1* 9/2019 Creedon ............ H04N 5/23229

OTHER PUBLICATIONS

Smid et al., "Rolling Shutter Camera Synchronization with Sub-millisecond Accuracy," Proceedings of the 12th International Joint Conference on Computer Vision, Imaging and Computer Graphics Theory and Applications, Jan. 2017, 8 pages.

* cited by examiner

CAPTURING IMAGES USING SUB-FRAME ILLUMINATION

TECHNICAL FIELD

This disclosure relates to image capture devices.

BACKGROUND

Systems incorporating a biometric identification technology such as face recognition or iris recognition often include a camera that captures an image of a user and may include a light-emitting diode (LED) light. The LED light can be used to provide sufficient lighting to capture the image of the user. The captured image is then processed to authenticate the user using the biometric identification technology.

SUMMARY

In one aspect, this document features a method for capturing an image, the method including generating a first control signal configured to cause a rolling shutter camera to capture an image of a subject over a first time period. The method also includes generating, at a first time point during the first time period, a second control signal configured to set a multi-spectral illumination source at a first intensity level. The multi-spectral illumination source is configured to illuminate the subject. The method further includes generating, at a second time point during the first time period, a third control signal configured to set the multi-spectral illumination source at a second intensity level that is less than the first intensity level. A portion of the image captured by the rolling shutter camera between the first and second time points includes a target feature associated with the subject.

In another aspect, this document features a system that includes a rolling shutter camera, a multi-spectral illumination source, and one or more processing devices in communication with both the rolling shutter camera and the multi-spectral illumination source. The one or more processing devices are configured to generate a first control signal configured to cause the rolling shutter camera to capture an image of a subject over a first time period. The one or more processing devices are also configured to generate, at a first time point during the first time period, a second control signal configured to set the multi-spectral illumination source at a first intensity level. The multi-spectral illumination source is configured to illuminate the subject. The one or more processing devices are further configured to generate, at a second time point during the first time period, a third control signal configured to set the multi-spectral illumination source at a second intensity level that is less than the first intensity level. A portion of the image captured by the rolling shutter camera between the first and second time points includes a target feature associated with the subject.

In another aspect, this document features one or more machine-readable storage devices comprising machine-readable instructions configured to cause one or more processing devices to perform various operations. The operations include generating a first control signal configured to cause a rolling shutter camera to capture an image of a subject over a first time period. The operations also include generating, at a first time point during the first time period, a second control signal configured to set a multi-spectral illumination source at a first intensity level. The multi-spectral illumination source is configured to illuminate the subject. The operations further include generating, at a second time point during the first time period, a third control signal configured to set the multi-spectral illumination source at a second intensity level that is less than the first intensity level. A portion of the image captured by the rolling shutter camera between the first and second time points includes a target feature associated with the subject.

Implementations of the above aspects can include one or more of the following features.

The target feature associated with the subject can include an eye region of the subject. The target feature associated with the subject can include eyes of the subject. Prior to generating the first control signal, a first image of the subject can be received from a first image sensor, wherein the first image is captured without the multi-spectral illumination source being set to the first intensity level. Based on the first image, a position of the target feature associated with the subject can be determined. The first image sensor can be disposed in a first camera, and the first image can be captured using a higher camera gain than a camera gain used by the rolling shutter camera to capture the image. Setting the multi-spectral illumination source at a second intensity level can include turning off the multi-spectral illumination source. A difference between the first time point and the second time point can be less than about 10 milliseconds. The multi-spectral illumination source can include a light-emitting diode (LED) element.

Various implementations described herein may provide one or more of the following advantages. By using a rolling shutter camera that is synchronized with a multi-spectral illumination source, high-quality images of a user can be captured without exposing the eyes of the user to high-intensity light for a period of time that might cause discomfort to the user. A short-duration illumination source can also reduce the possibility of eye-blinking caused by long exposure to high-intensity lights. This in turn reduces the chances of having to recapture the images, particularly in biometric authentication techniques that are based on identifying one or more characteristics of the eye.

Figure 1:
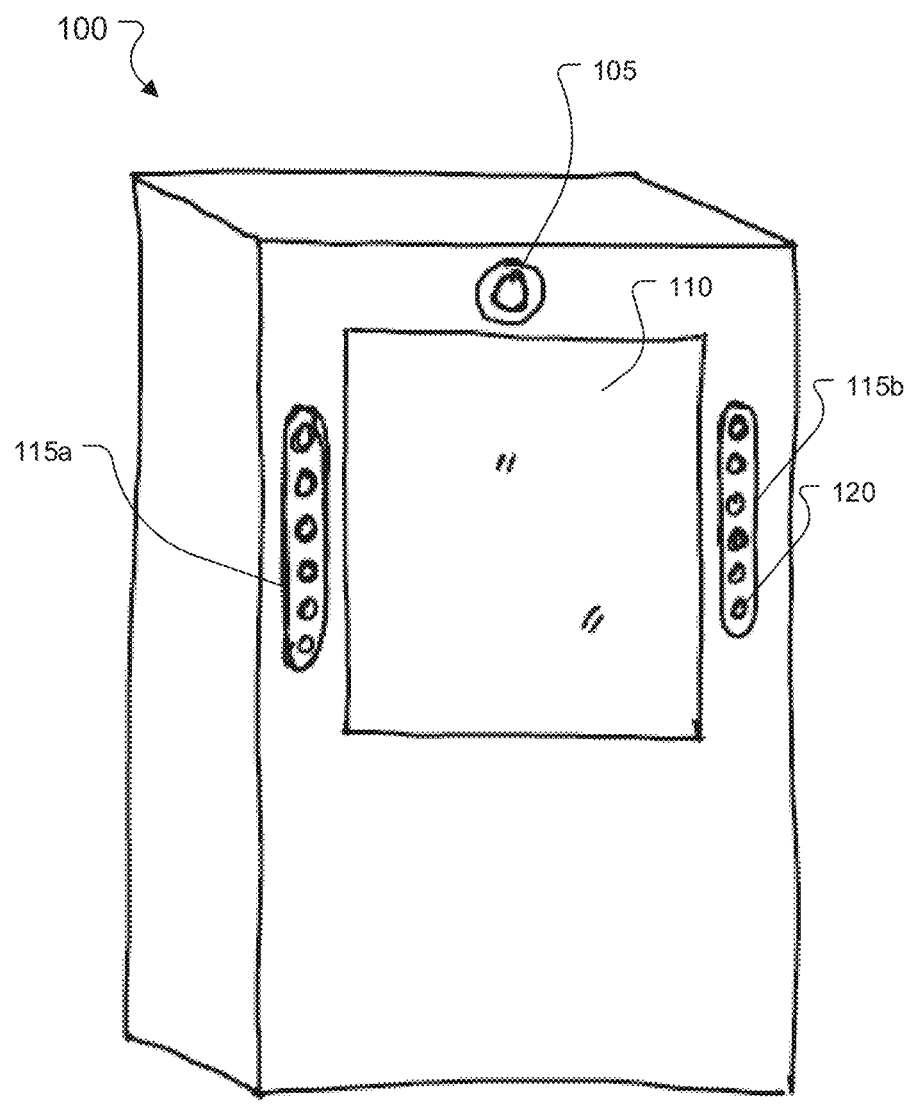
FIG. 1 shows a kiosk machine as an example environment in which the technology described herein may be used.

Repeat use of reference characters in the present specification and drawings is intended to represent same or analogous features or elements.

DETAILED DESCRIPTION

This document describes technology that may allow capturing high-quality eye images without causing discomfort that can result from relatively long exposure to multi-spectral illumination sources. Various biometric identification/authentication systems are based on capturing one or more images, which are then compared with or analyzed with reference to template images captured during an enrollment process. For example, a biometric authentication system that uses face or eye identification may require enrolling users to pose for one or more images of their face during an enrollment process. The images captured during the enrollment process may be stored on a storage device accessible to the biometric authentication system. During run-time, a facial image of a user can be captured and compared with one or more template images to determine if the user may be authenticated. Additionally, when using a rolling shutter camera to capture the images, about 15% of light entering the lens can be blocked or absorbed by filters of the camera. In some implementation, the camera uses a low camera gain to capture the images in order to reduce image noise. Thus, the face of the user may need to be illuminated with multi-spectral, high-intensity light arrays for the image sensor to be able to capture high-quality images required in biometric authentication systems.

The technology described herein allows for illuminating the target with a high-intensity illumination source without causing discomfort to the user. For example, the high-intensity illumination source may be a multi-spectral illumination source such as a light-emitting diode (LED) that is controlled to be radiated to the eyes of the user for a very short duration (e.g., 5 to 7 milliseconds). The technology described herein espouses synchronizing the multi-spectral illumination source with a rolling shutter camera such that the illumination source is switched on only for a sub-frame duration when a feature of interest in being captured by the rolling shutter camera. This allows the camera to capture the feature of interest at a high quality without exposing the eyes of the user to high-intensity lights for periods of time that may cause discomfort to the user. For example, when capturing eye print images with a rolling shutter camera, if the multi-spectral illumination source is switched on only when the shutter is capturing the eye region of the face (and switched off before and after that during the capture of the frame), user-discomfort due to the bright illumination may be significantly less than that if the illumination source is kept switched on for the entire time during which the full frame is captured. The subject technology can therefore improve the user experience significantly. Additionally, such technology can help r educe chances of partial eye blinks that are caused by the flashing of lights for a long duration.

FIG. 1 shows a kiosk machine 100 as an example environment in which the technology described herein may be used. Such kiosk machines may be used for various purposes that require authenticating users via one or more biometric authentication processes. For example, the kiosk 100 can include an ATM that allows a user to withdraw money from a bank account. In another example, the kiosk 100 may be deployed at a restaurant or a fast-food outlet, and allow a user to order and pay for food. The kiosk 100 may also be deployed at an entry point (e.g., at the gate of an arena or stadium) to authenticate entrants prior to entering the venue. In general, the kiosk 100 may be deployed at various types of locations to authenticate users interactively, or even without any active participation of the user.

In some implementations, the kiosk 100 can include one or more components that support a biometric authentication system. For example, the kiosk 100 can include a rolling shutter camera 105 that captures images of users interacting with the kiosk 100. The captured images may be processed to identify/authenticate valid users, and/or permit or deny access to the services/products being offered through the kiosk. For example, the kiosk 100 may include a display device 110 (e.g., a capacitive touch screen) that allows a user to select and order food at a retail outlet. Once the user completes the selection via user-interfaces presented on the display device 110, the user may be asked to look towards the camera 105 for authentication. The images captured using the camera 105 may then be used to authenticate/identify a pre-stored profile for the user, and the payment for the food may then be automatically deducted from an account linked to the profile.

In some implementations, the images captured using the rolling shutter camera 105 can be processed using an underlying biometric authentication system to identify/authenticate the user. In some implementations, the biometric authentication system may extract from the images, various features—such as features derived from the face, iris, vasculature underlying the sclera of the eye, or the periocular region—to identify/authenticate a particular user based on matching the extracted features to that of one or more template images stored for the user during an enrollment process. The biometric authentication system may use a machine-learning process (e.g., a deep learning process implemented, for example, using a deep neural network architecture) to match the user to one of the many templates stored for various users of the system. In some implementations, the machine learning process may be implemented, at least in part, using one or more processing devices deployed on the kiosk 100. In some implementations, the kiosk 100 may communicate with one or more remote processing devices (e.g., one or more remote servers) that implement the machine learning process.

In some implementations, the kiosk 100 can include one or more multi-spectral illumination sources 115a and 115b (115, in general), and are configured to generate electromagnetic radiation at high intensity. For example, the multi-spectral illumination sources 115 can each include one or more light emitting diode (LED) elements 120 that may be controlled to generate electromagnetic radiation patterns or sequences at high intensity. In some implementations, illumination sources 115 are configured to radiate electromagnetic radiation in the infrared (IR) wavelength range, or an additional illumination source (not shown) can be configured to radiate electromagnetic radiation in the infrared (IR) wavelength range in addition to the LED elements 120. While the example in FIG. 1 shows two illumination sources 115 that are physically separated along a horizontal direction, various other configurations are also possible.

Figures 2A, 2B, 2C:
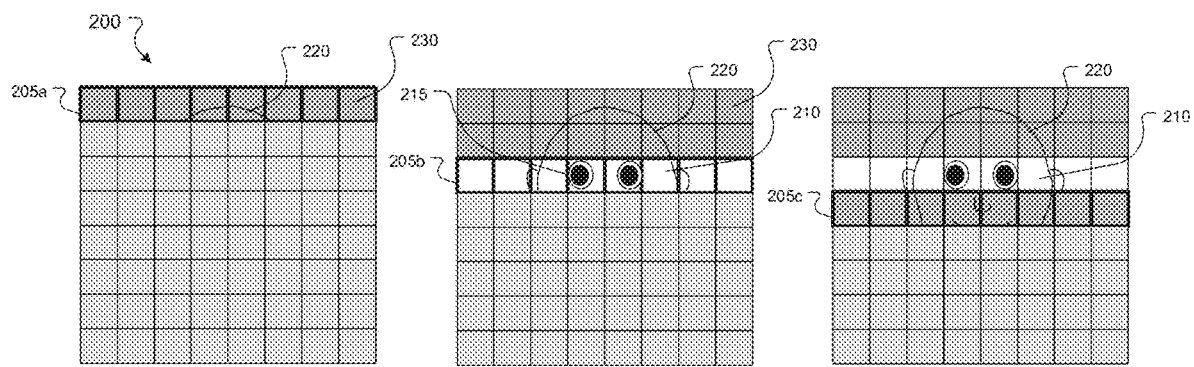
FIGS. 2A-2C show a sequence of an image sensor capturing an image using a rolling shutter and a sub-frame illumination method.

In some implementations, the illumination sources 115 can be configured to begin illuminating the face of a user at a point in time at which an electronic rolling shutter of the camera begins expose pixels of an image sensor to light. Such pixels can capture light associated with a portion of the image, such as an eye region. FIGS. 2A-2C show a sequence of stages in an image sensor 200 (e.g., a complementary metal-oxide-semiconductor sensor) with an electronic rolling shutter being used to capture an image of a user 220 using a sub-frame illumination effect. Specifically, the rolling shutter of the camera captures an image of user 220 over a time period. The time period is the time that it takes for the rolling shutter to expose every row (205a-205n, 205 in general) of pixels 230 from top to bottom of the image sensor 200 to capture an entire image or frame. Within such time period, a multi-spectral illumination source (shown in FIG. 1) illuminates the user 220 for a relatively shorter, sub-frame period of time when the rolling shutter exposes the pixels that capture an image of the eyes 215 of the user 220. For example, as depicted in FIG. 2A, the top row 205a of pixels is first exposed at the beginning of the time period for the pixels to receive light. As shown in FIG. 2B, after exposing the first two rows of pixels, the rolling shutter exposes the third row 205b of pixels to capture light representative of an eye region 210 of the image. Eye region 210 may include an area of the face of user 220 that extends laterally across the entire face of the user 220, and extends vertically between the eyebrows and the cheekbones (a width of about 50 millimeters). As the pixels 230 that capture the image of the eye region 210 are exposed, the multi-spectral illumination source illuminates the user 220 at an intensity level that is sufficient to capture high quality images of the eyes 215. As shown in FIG. 2C, after the rolling shutter exposes the row of pixels capturing the eye region 210, the next row 205c of pixels is exposed. As row 205c is exposed, the multi-spectral illumination sources may be controlled to illuminate the user 220 at an intensity level that is less than the first intensity level (e.g., in some cases the second intensity level can correspond to the illumination source being turned off) and that is unlikely to cause discomfort to the user. Thus, the resulting image captured by the rolling shutter camera is a face of user 220 with just the eye region 210 being illuminated by the multi-spectral illumination source. The rolling shutter camera may use a low camera gain to capture the image to reduce image noise.

Though FIGS. 2A-2C show only one row of pixels being exposed at a time, it would be understood that such configuration is illustrated for simplicity purposes, and thus is representative of various configurations. For example, multiple rows of pixels may be exposed at the same time. In some implementations, the eye region 210 can be captured by multiple pixel rows and in multiple frames as the rolling shutter exposes rows of pixels that sequentially capture parts of the eye region 210. In some implementations, a mechanical rolling shutter can be used instead of an electronic rolling shutter. For example, as the gap of the mechanical rolling shutter exposes the image sensor to light associated with eye region 210, the illumination source is activated to illuminate the user.

Still referring to FIGS. 2A-2C, the rolling shutter image sensor 200 and the illumination source shown in FIG. 1 can be synched together and connected to a controller or processing device (shown in FIG. 3) that generates signals to perform the steps mentioned above. For example, the processing device may generate a first control signal that causes the rolling shutter camera 105 to capture an image of user 220 over a time period such as 65 milliseconds. After about 10 milliseconds from the time the rolling shutter image sensor begins to capture the picture, the pixels that capture eye region 210 (or a first portion of the eye region) may be exposed. As such pixels are exposed, the processing device generates a second control signal (e.g., a trigger signal) that turns on the illumination source to illuminate user 220. In some implementations, the trigger signal can be fed to an interrupt driven light control system that controls the illumination source to turn on and off. The rolling shutter may expose (or traverse) the pixels 230 in row 205b that capture the entire eye region 210 in about 5-7 milliseconds. Thus, at about 17-20 milliseconds from the time the rolling shutter sensor began capturing the image, the processing device may generate a third control signal that turns off or lowers the intensity of the multi-spectral illumination source. The rolling shutter may take another 10 milliseconds to sequentially expose the rest of the pixels to finish capturing the entire image of user 220. In this example, the entire image is captured in about 30-33 milliseconds (ms), in which for the first 10 ms, the area above the eye region is captured without high-intensity illumination, for the 10-17 ms period, the eye region is captured with synchronized high-intensity illumination, and the rest of the image is captured in the remaining 17-33 ms period without the high-intensity illumination. The final image or picture features an eye region 210 that is more illuminated (and thus of a higher quality) than the rest of the image. The speed of the rolling shutter may vary. For example, the amount of time needed to capture a complete image of the user 220 can vary between 28 and 33 milliseconds (considering a frame rate of approximately 30 fps), and the amount of time needed to capture an image of the eye region 210 can vary between 5 and 7 milliseconds, or the time taken by the rolling shutter to scan the entire eye region (whichever is higher).

In some implementations, the processing device may be programmed with an expected location of the eye region 210 based on an offline determination. For example, the processing device may include a pre-determined point of reference of where the eyes of the user are expected to be when capturing the image. For example, as shown in FIG. 1, display device 110 can display instructions and/or a frame indicating the user to position his or her face within that frame, and the processor may use that point of reference to capture the image. In other implementations and as further described in detail below, an image sensor may capture an image of the user before using sub-frame illumination. Such method may be used to determine the location of the eyes in real-time.

Figure 3:
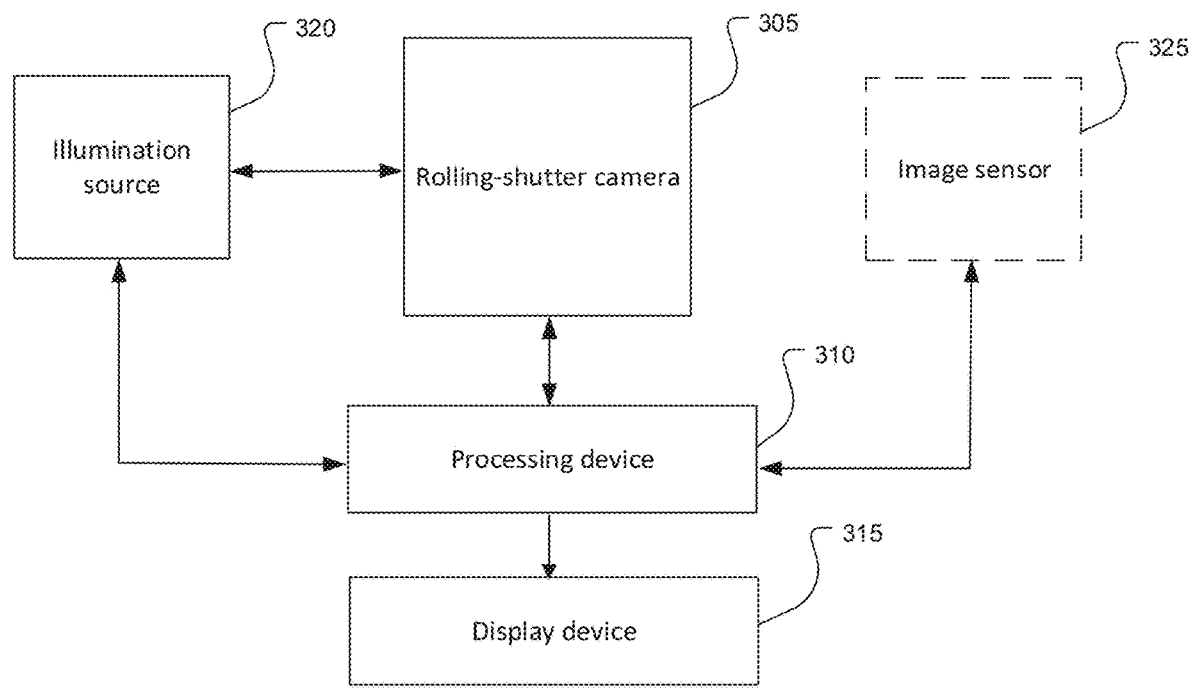
FIG. 3 is a block diagram of an example configuration that can be used to implement the technology described herein.
Figure 4A:
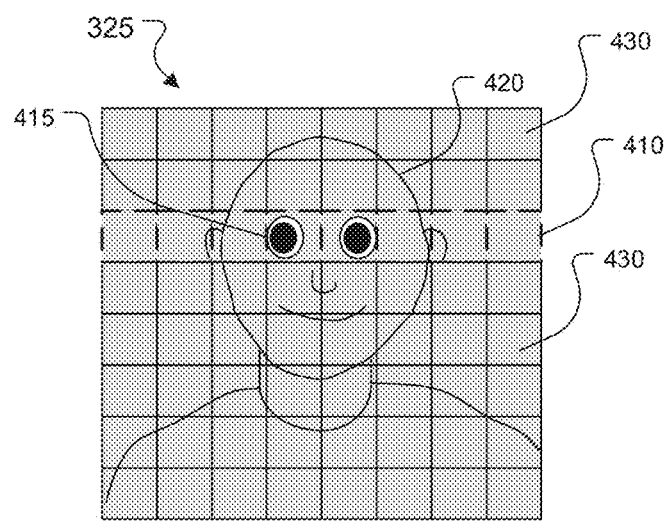
FIG. 4A is an example illustrating the implementation of an image sensor to determine the location of an eye region.

Referring now to FIGS. 3 and 4A, one or more processing devices 310 can be in data communication with rolling shutter camera 305 and multi-spectral illumination source 320. Processing device 310 can also be communicatively coupled to an image sensor 325 that captures images of the user at high camera gain for determining a position of an eye region 410 (FIG. 4A) in real-time. Image sensor 325 can be an image sensor of rolling shutter camera 305, or it can be a sensor of a board camera, a video camera, or another type of camera (not shown). FIG. 4A shows a representation of an image of a user 420 that may be illuminated only by ambient light. The image may be captured by image sensor 325 of a camera using high camera gain. High camera gain can be used to take pictures under ambient light to increase a brightness of the picture and thus allow the processing device 310 to determine the location of the eyes. In some implementations, the camera of image sensor 324 may capture about 10-30 frames per second. Processing device 310 may receive, from image sensor 325, the captured image of user 420 having an eye region 410. Processing device 310 may then determine, based on the image, a position of the eye region. For example, the processing device may be configured to detect nodal points of the face and determine which nodal points represent the eyes 415 of user 420. Upon detecting the eyes 415 of the user 420, processing device 310 may generate coordinates that represent a two-dimensional area within the image that represents eye region 410. Upon determining the location and size of the eye region 410, processing device 310 may generate, based on the position and size (e.g., width) of the eye region and a predetermined speed of the rolling shutter, a mathematical model representing a position of the rolling shutter with respect to a time period. Referring back to FIGS. 2A-2C, such mathematical model indicates the first time point at which the rolling shutter camera begins to expose the pixels 230 associated with the eye region 210, and a second time point at which the rolling shutter of the camera finishes exposing the pixels 230 associated with the eye region 210. Such mathematical model may be used to synchronize the illumination source with the camera to perform sub-frame illumination as described above with respect to FIGS. 2A-C.

Figure 4B:
FIG. 4B is example image that is captured using the technology described herein.

FIG. 4B depicts an example image that is captured using the technology and methods described above with respect to FIGS. 2A-2C. As shown in FIG. 4B, the eye region 210 of the captured image is brighter than the rest of the captured image. For example, the eyes 215 and area surrounding the eyes of user 220 is brighter and clearer than the rest of the face of user 220. The quality of the image is such that the eyes 215 of user 220 are captured with enough detail that it can be reliably used in biometric authentication systems.

Referring again to FIG. 3, outputs from the image sensor 325 can be processed using one or more processing devices 310. In some implementations, the output of the one or more processing devices 310 may be used to drive a display device 315. In some implementations, the display device 315 can be the display device 110 of the kiosk described with reference to FIG. 1. In some implementations, the display device 315 can be disposed on a mobile device such as a smartphone, tablet computer, or an e-reader.

Figure 5:
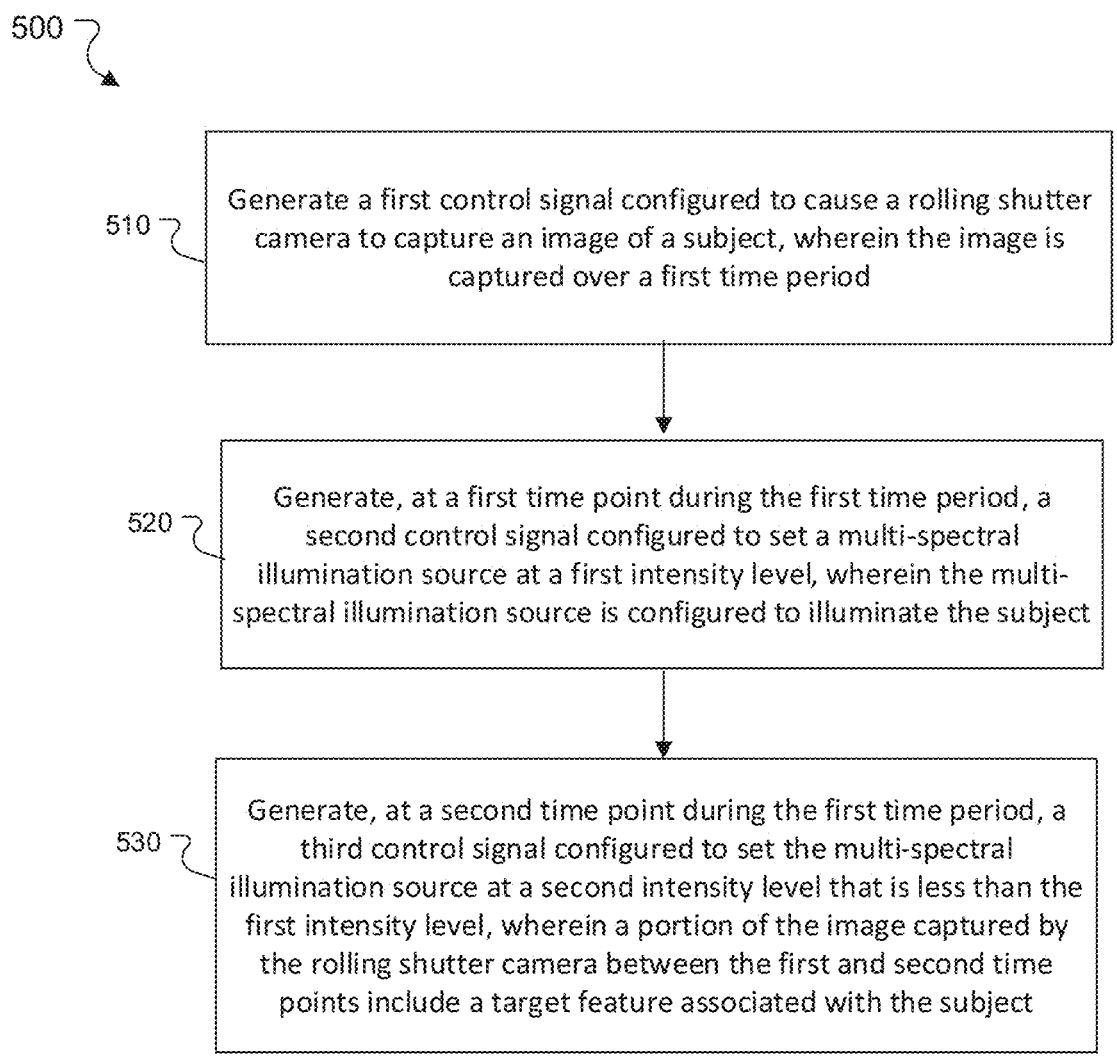
FIG. 5 is a flowchart of an example process for capturing an image in accordance with technology described herein.

FIG. 5 is a flowchart of an example process for generating a representation of an image that is captured using sub-frame illumination. In some implementations, at least a portion of the process 500 may be executed by one or more processing devices disposed within a kiosk such as the kiosk 100 described with reference to FIG. 1. In some implementations, at least a portion of the process 500 may be executed at one or more servers (such as servers or computing devices in a distributed computing system) in communication with remote components such as one or more processing devices disposed within a kiosk.

Operations of the process 500 includes generating a first control signal configured to cause a rolling shutter camera to capture an image of a subject, wherein the image is captured over a first time period (510). Operations of the process 500 also includes generating, at a first time point during the first time period, a second control signal configured to set a multi-spectral illumination source at a first intensity level, wherein the multi-spectral illumination source is configured to illuminate the subject (520). The control signals are generated by one or more processing devices that have a predetermined reference point where an eye region of the user can be expected to be. In some implementations, the position of the eye region can be detected by the rolling shutter camera or an additional camera that captures images illuminated by ambient light (e.g., low quality image)

Operations of the process 500 also includes generating, at a second time point during the first time period, a third control signal configured to set the multi-spectral illumination source at a second intensity level that is less than the first intensity level, wherein a portion of the image captured by the rolling shutter camera between the first and second time points include a target feature associated with the subject (530). The third control signal is sent to the illumination source to reduce the intensity of the illumination (or switch off the illumination source) such that the rest of the face is captured without the high-intensity illumination.

In some implementations, operations of the process 500 may also include, prior to generating the first control signal, receiving, from a first image sensor, a first image of the subject illuminated by ambient light. In some implementations, the method further includes determining, based on the first image, a position of the target feature associated with the subject. In some implementations, the first image sensor is part of a first camera and the first image is captured using a higher camera gain that a camera gain used to capture the image captured by the rolling shutter camera.

Figure 6:
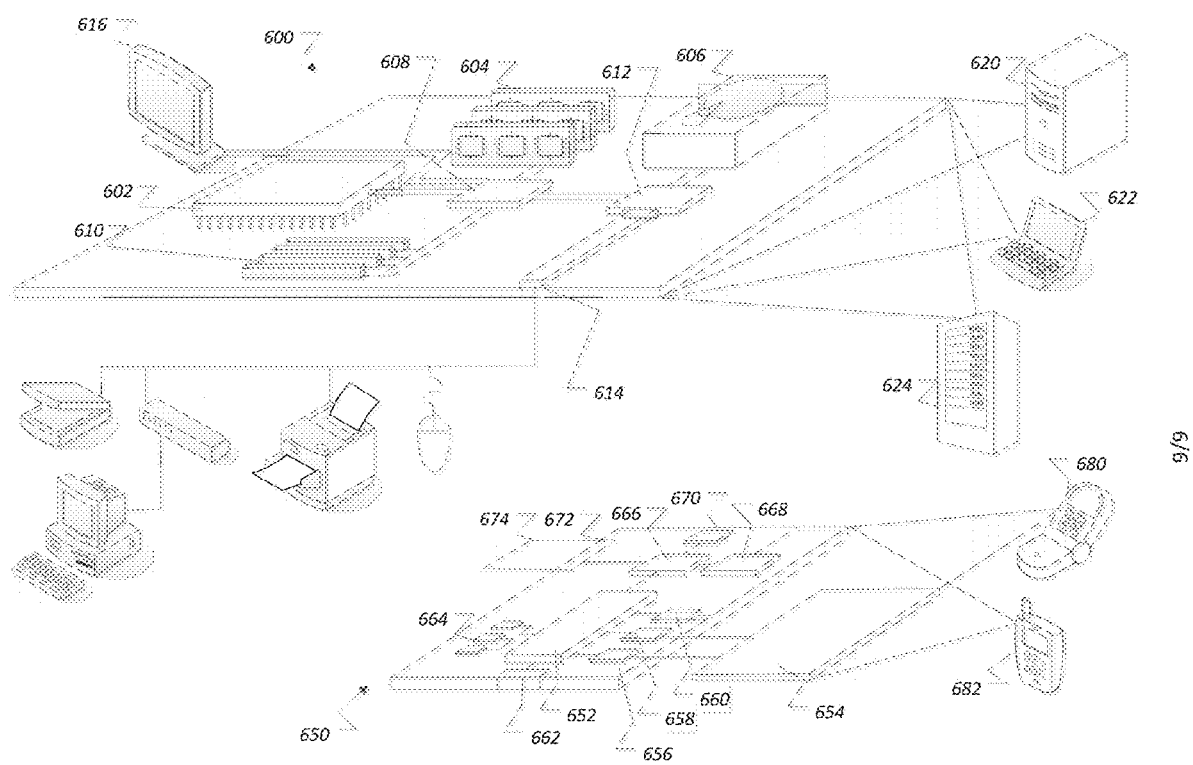
FIG. 6 is a block diagram representing examples of computing devices.

FIG. 6 shows an example of a computing device 600 and a mobile device 650, which may be used with the techniques described here. For example, referring to FIG. 1, the kiosk device 100 can include one or more of the computing device 600 or the mobile device 650, either in part or in its entirety. Computing device 5400 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, memory on processor 602, or a propagated signal.

The high speed controller 608 manages bandwidth-intensive operations for the computing device 600, while the low speed controller 612 manages lower bandwidth-intensive operations. Such allocation of functions is an example only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, memory on processor 652, or a propagated signal that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, and so forth) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, tablet computer, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/ or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback). Input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications may be made without departing from the scope of the inventive concepts described herein, and, accordingly, other implementations are within the scope of the following claims.

What is claimed is:

1. A method for capturing an image, the method comprising:
   receiving, from a first image sensor, a first image of a subject;
   determining, based on the first image, a position of a target feature associated with the subject and a size of the target feature;
   determining, based on the position of the target feature and the size of the target feature, a first time point and a second time point;
   generating a first control signal configured to cause a rolling shutter camera to capture an image of the subject, wherein the image is captured over a first time period;
   generating, at the first time point during the first time period, a second control signal configured to set a multi-spectral illumination source at a first intensity level, wherein the multi-spectral illumination source is configured to illuminate the subject; and
   generating, at the second time point during the first time period, a third control signal configured to set the multi-spectral illumination source at a second intensity level that is less than the first intensity level, wherein a portion of the image captured by the rolling shutter camera between the first and second time points includes the target feature.

2. The method of claim 1, wherein the target feature comprises an eye region of the subject.

3. The method of claim 2, wherein the target feature associated with the subject comprises eyes of the subject.

4. The method of claim 1, wherein the first image of the subject is captured without the multi-spectral illumination source being set to the first intensity level.

5. The method of claim 1, wherein the first image sensor is disposed in a first camera, and wherein the first image is captured using a higher camera gain than a camera gain used by the rolling shutter camera to capture the image.

6. The method of claim 1, wherein setting the multi-spectral illumination source at a second intensity level comprises turning off the multi-spectral illumination source.

7. The method of claim 1, wherein a difference between the first time point and the second time point is less than about 10 milliseconds.

8. The method of claim 1, wherein the multi-spectral illumination source comprises a light-emitting diode (LED) element.

9. A system comprising:
   a rolling shutter camera;
   a first image sensor
   a multi-spectral illumination source; and
   one or more processing devices in communication with the rolling shutter camera, the first image sensor, and the multi-spectral illumination source, the one or more processing devices configured to perform operations comprising:
      receiving, from the first image sensor, a first image of a subject;
      determining, based on the first image, a position of a target feature associated with the subject and a size of the target feature;
      determining, based on the position of the target feature and the size of the target feature, a first time point and a second time point;
      generating a first control signal configured to cause the rolling shutter camera to capture an image of the subject, wherein the image is captured over a first time period;
      generating, at the first time point during the first time period, a second control signal configured to set the multi-spectral illumination source at a first intensity level, wherein the multi-spectral illumination source is configured to illuminate the subject; and
      generating, at the second time point during the first time period, a third control signal configured to set the multi-spectral illumination source at a second intensity level that is less than the first intensity level, wherein a portion of the image captured by the rolling shutter camera between the first and second time points includes the target feature.

10. The system of claim 9, wherein the target feature associated with the subject comprises an eye region of the subject.

11. The system of claim 10, wherein the target feature associated with the subject comprises eyes of the subject.

12. The system of claim 9, wherein the first image of the subject is captured without the multi-spectral illumination source being set to the first intensity level.

13. The system of claim 9, wherein the first image sensor is disposed in a first camera different from the rolling shutter camera, and wherein the first image is captured using a higher camera gain than a camera gain used by the rolling shutter camera to capture the image.

14. The system of claim 9, wherein setting the multi-spectral illumination source at a second intensity level comprises turning off the multi-spectral illumination source.

15. The system of claim 9, wherein a difference between the first time point and the second time point is less than about 10 milliseconds.

16. The system of claim 9, wherein the multi-spectral illumination source comprises a light-emitting diode (LED) element.

17. One or more machine-readable storage devices comprising machine-readable instructions configured to cause one or more processing devices to perform operations comprising:

receiving, from a first image sensor, a first image of a subject;
 determining, based on the first image, a position of a target feature associated with the subject and a size of the target feature;
 determining, based on the position of the target feature and the size of the target feature, a first time point and a second time point;
 generating a first control signal configured to cause a rolling shutter camera to capture an image of the subject, wherein the image is captured over a first time period;
 generating, at the first time point during the first time period, a second control signal configured to set a multi-spectral illumination source at a first intensity level, wherein the multi-spectral illumination source is configured to illuminate the subject; and
 generating, at the second time point during the first time period, a third control signal configured to set the multi-spectral illumination source at a second intensity level that is less than the first intensity level, wherein a portion of the image captured by the rolling shutter camera between the first and second time points includes the target feature.

18. The one or more machine-readable storage devices of claim 17, wherein the target feature comprises an eye region of the subject.

19. The method of claim 1, comprising:

generating, based on the position of the target feature and the size of the target feature, a mathematical model representing a position of a rolling shutter of the rolling shutter camera with respect to the first time period.

20. The system of claim 9, wherein the operations comprise:

generating, based on the position of the target feature and the size of the target feature, a mathematical model representing a position of a rolling shutter of the rolling shutter camera with respect to the first time period.

21. The one or more machine-readable storage devices of claim 17, wherein the operations comprise:

generating, based on the position of the target feature and the size of the target feature, a mathematical model representing a position of a rolling shutter of the rolling shutter camera with respect to the first time period.

\* \* \* \* \*

UNITED STATES PATENT AND TRADEMARK OFFICE
CERTIFICATE OF CORRECTION

PATENT NO. : 10,728,447 B2  
APPLICATION NO. : 16/172447  
DATED : July 28, 2020  
INVENTOR(S) : Zikomo Fields and Yash Joshi It is certified that error appears in the above-identified patent and that said Letters Patent is hereby corrected as shown below:

In the Claims

Column 11, Line 45, Claim 1, delete "subject," and insert -- subject; --, therefor.

Signed and Sealed this  
Twenty-seventh Day of July, 2021

Drew Hirshfeld  
*Performing the Functions and Duties of the*  
*Under Secretary of Commerce for Intellectual Property and*  
*Director of the United States Patent and Trademark Office*